Patented Apr. 28, 1942

2,280,790

UNITED STATES PATENT OFFICE 2,280,790

UNSATURATED ETHER NITRILES

Herman A. Bruson, Philadelphia, Pa., assignor to The Resinous Products & Chemical Company, Philadelphia, Pa.

No Drawing. Application December 23, 1940, Serial No. 371,403

12 Claims. (Cl. 260—464)

This invention relates to β-cyanoalkyl ethers of unsaturated monohydric alcohols and to the process for preparing them. These compounds have the general formula $$R_1-O-CH_2-\underset{R_2}{CH}.CN$$

in which $R_1$ is the organic radical of an unsaturated monohydric alcohol of the aliphatic, aromatic, cycloaliphatic, or heterocyclic series containing up to about eighteen carbon atoms and $R_2$ is hydrogen or a methyl group.

These ethers are prepared by reacting acrylonitrile or methacrylonitrile with an unsaturated alcohol in the presence of a catalyst having a strongly alkaline reaction. The reaction proceeds readily at ordinary temperature and preferably may be carried out in an inert solvent such as benzene or ether although the use of a solvent is not essential. Unsaturated alcohols which may be employed in the process are primary, secondary or tertiary alcohols having one or more olefinic or acetylenic bonds, for example allyl, methallyl, crotonyl, oleyl, propargyl, cinnamyl, or furfuryl alcohols, geraniol, linalool, citronellol, dimethyl ethinyl carbinol, alpha terpineol and other similar alcohols.

As strongly alkaline catalysts, there may be employed, for instance, oxides, hydroxides, amides, alcoholates, or phenolates of the alkali metals, or the free alkali metals themselves. Quaternary ammonium hydroxides may also be used in this connection. When, for example, an alkali metal alcoholate is employed as the catalyst, it may be sodium or potassium methylate or ethylate or it may be the alcoholate of the alcohol taking part in the reaction. In the latter case, the alkali metal may be dissolved directly in the alcohol but a more convenient method is to employ sodium oxide, $Na_2O$, which dissolves readily in alcohols to form the alcoholate. The amount of catalyst normally used is about 0.5 to 2.0% by weight calculated on the amount of alcohol employed.

The process is carried out in general by slowly adding the acrylo- or methacrylonitrile to the alcohol containing the catalyst, the rate of addition being regulated so that the temperature of the reaction mixture does not rise much above 60° C. External cooling may be employed if desired. The reactants are usually employed in equimolecular proportions although it is advantageous to use a small excess of the alcohol.

The products obtained by this process are useful as insecticides and intermediates for the preparation of resins. They may be converted to the corresponding amides or acids by hydrolysis.

The following examples will illustrate the invention.

Example 1

A mixture consisting of 72 g. of methallyl alcohol and 2 g. of powdered sodium oxide ($Na_2O$) was stirred and heated under a reflux condenser on a steam bath for five minutes. The clear solution obtained was then cooled to 10° C., and 53 g. of acrylonitrile allowed to drip in gradually during one hour while the solution was stirred and maintained at a reaction temperature of 15–25° C. by means of external cooling. The mixture was then stirred at 15–25° C. for six hours longer, poured into water containing sufficient hydrochloric acid to neutralize the mixture, and an oil layer separated, washed, filtered and distilled at atmospheric pressure. The desired product distilled over at 209–212° C. as a colorless oil, giving a yield of 89 g. Its analysis agreed with the formula:

$$CH_2=C(CH_3)-CH_2-O-CH_2CH_2CN$$

Example 2

By using 58 g. of allyl alcohol in place of the methallyl alcohol, as described in Example 1, allyloxypropionitrile $$CH_2=CH-CH_2-O-CH_2CH_2CN$$

was obtained as a colorless oil boiling at 198–200° C.

Example 3

A mixture consisting of 268 g. of oleyl alcohol and 2 g. of sodium oxide ($Na_2O$) was stirred for one-half hour at 90–95° C. and then cooled to 20° C. To this was added dropwise 53 g. of acrylonitrile during 45 minutes, while the solution was stirred and maintained at a temperature of 20–25° C. by means of external cooling. The mixture was then stirred at 20–30° C. for seven hours longer, poured into water containing sufficient hydrochloric acid to effect neutralization, and an oil layer separated, washed with water, filtered and distilled in vacuo. After a forerun of 42 g. of oil distilling at 185–200° C./1–2 mm. had come over, consisting of a mixture of oleyl alcohol and oleyloxypropionitrile, the main fraction distilled over between 200° and 220° C. at 1–2 mm. as a colorless oil weighing 130 g. Analysis showed it to be practically pure oleyloxypropionitrile, $$C_{18}H_{35}-O-CH_2CH_2CN$$

Example 4

(a) A mixture of 98 g. of furfuryl alcohol and 2 g. of sodium oxide was stirred for ten minutes at 90° C., then cooled to 10° C., and 53 g. of acrylonitrile added dropwise during one hour to the mixture, while the mixture was stirred and kept at a temperature of 10–20° C. The mixture was then stirred eight hours longer at 20–30° C., poured into 200 cc. of water and neutralized. The oil which separated was washed, filtered, and distilled in vacuo. The desired furfuryloxypropionitrile

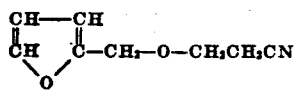

distilled over at 130–135° C./10 mm. as a colorless oil. The yield was 102 g.

(b) 98 g. of furfuryl alcohol was mixed with 4 g. of aqueous 50% sodium hydroxide solution, 53 g. of acrylonitrile slowly added thereto, and the mixture stirred for an hour while the temperature was maintained at 40–50° C. The reaction mixture was then neutralized with dilute hydrochloric acid whereupon an oil layer separated. This oil layer was washed with water, filtered, and distilled in vacuo to give a colorless oil boiling at 130–135° C./10 mm., and corresponding to the formula given in 4 (a) above.

(c) The preparation according to 4 (b) was repeated with the substitution for the sodium hydroxide of 5 g. of an aqueous solution containing 40% of trimethyl benzyl ammonium hydroxide. A colorless oil boiling at 130–135° C./10 mm. was likewise obtained, the formula of which corresponded to that given in 4 (a) above.

Example 5

A mixture consisting of 154 g. of geraniol and 2 g. of sodium oxide was heated for 20 minutes at 90° C. on a steam bath and then cooled to 10° C. Acrylonitrile (53 g.) was then added dropwise during one-half hour while the mixture was stirred and maintained at a temperature of 10–20° C. by external cooling. The mixture was then stirred seven hours longer at 25° C., and poured into water. The oil which separated was washed, filtered, and distilled in vacuo. The desired geranyloxypropionitrile $(CH_3)_2C=CHCH_2CH_2C$
$\qquad (CH_3)=CH—CH_2—O—CH_2CH_2CN$ distilled over at 158–160° C./10 mm. as a colorless oil in 60% yield.

Example 6

A mixture of 77 g. of linalool and 1 g. of sodium oxide was heated for 20 minutes at 90–95° C. on a steam bath and then cooled to 0° C. Acrylonitrile (27 g.) was then added dropwise during 20 minutes while the mixture was stirred and maintained at a temperature of 3–6° C. by external cooling. The mixture was then stirred at 25–28° C. for seven hours longer and poured into water whereupon an oil layer formed. The oil was washed, separated, filtered and distilled in vacuo. Linalyloxypropionitrile

distilled over at 145–150° C./10 mm. as a colorless oil.

Example 7

To a solution of 1 g. of sodium methylate in 53.6 g. of cinnamyl alcohol there was added 25 cc. of dry benzene. The mixture was cooled to 20° C. and 27 g. of acrylonitrile added dropwise while the mixture was stirred and cooled. After addition of the acrylonitrile, the mixture was stirred at 25° C. for 6½ hours, then mixed with 200 cc. of water and filtered from polymeric material. The oil layer which separated was distilled under reduced pressure, and the fraction boiling at 160–170° C./1–2 mm. was collected, with a yield of 55 g. The product has the formula $C_6H_5CH=CHCH_2—O—CH_2CH_2CN$.

Example 8

To a solution of 1 g. of powdered sodium methylate in 62.4 g. of citronellol there was added 22 g. of acrylonitrile while stirring and maintaining the temperature at 25–28° C. with external cooling. The mixture was then stirred for an additional seven hours at 25–28° C., thereafter poured into water, and an oil layer separated and distilled under reduced pressure. The desired product boiled at 155–160° C./10 mm. Yield, 65 g. It was a colorless oil of pleasant odor having the formula

Example 9

A solution of 2 g. of powdered sodium methylate in 154 g. of alpha-terpineol was treated with 53 g. of acrylonitrile, as described in Example 8. The product obtained boiled at 155–160° C./10 mm. It formed a colorless oil having the formula

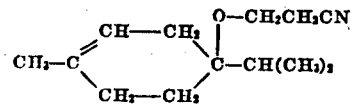

Example 10

0.5 g. of powdered sodium methylate was added to 23 g. of ethinyl dimethyl carbinol $(CH_3)_2C(OH)C\equiv CH$. The solution was cooled to 17° C. and 14.8 g. of acrylonitrile added dropwise during 20 minutes, while the mixture was stirred and cooled to 17–20° C. It was then stirred at 17–25° C. for an additional seven hours, poured into 300 cc. of water, and the oil which separated was washed and distilled under reduced pressure. The product came over as a colorless oil at 103–105° C./26 mm., giving a yield of 25.7 g. The product is 3-(β-cyanoethoxy)-3-methylbutine-1 having the formula

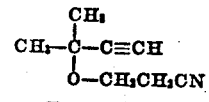

Example 11

1.4 g. of powdered sodium methylate was dissolved at 80–90° C. in 60 g. of 3-hydroxy-3-methyl-butene-1. The solution was cooled to 10° C., and 38 g. of acrylonitrile was added thereto during 40 minutes while the solution was stirred and maintained at a temperature of 10–15° C. The mixture was then stirred for five hours longer while the temperature was maintained at 10–20° C., whereupon it was poured into 200 cc. of water, neutralized and the oil which separated was filtered, washed and distilled in vacuo. The desired product came over at 100–105° C./26 mm. as a colorless oil having the formula $$CH_2=CH-\underset{\underset{CH_3}{|}}{\overset{\overset{CH_3}{|}}{C}}-O-CH_2CH_2CN$$

*Example 12*

To a solution of 1 g. of sodium methylate in 36 g. of methallyl alcohol there was gradually added with continual stirring and cooling to 15° C. 33.5 g. of methacrylonitrile. The mixture was stirred then for seven hours at 20–25° C. and thereafter poured into water, neutralized and the oil layer which separated was washed and distilled under reduced pressure. The methallyloxy isobutyronitrile $$CH_2=C(CH_3)CH_2-O-CH_2-CH(CH_3)-CN$$

distilled over between 100° and 110° C. at 26 mm. as a colorless oil.

I claim:

1. The process of preparing β-cyanoalkyl ethers having the general formula $$R_1-O-CH_2-\underset{\underset{R_2}{|}}{CH}-CN$$

in which $R_1$ is the organic radical of an unsaturated monohydric alcohol and $R_2$ is a member of the group consisting of hydrogen and the methyl group which comprises reacting the unsaturated alcohol $R_1OH$ with an unsaturated nitrile $$CH_2=\underset{\underset{R_2}{|}}{C}-CN$$

in the presence of a catalyst having a strongly alkaline reaction.

2. The process of preparing β-cyanoalkyl ethers having the general formula $$R_1-O-CH_2-\underset{\underset{R_2}{|}}{CH}-CN$$

in which $R_1$ is the organic radical of a diolefinic monohydric alcohol and $R_2$ is a member of the group consisting of hydrogen and the methyl group which comprises reacting the diolefinic alcohol $R_1OH$ with an unsaturated nitrile $$CH_2=\underset{\underset{R_2}{|}}{C}-CN$$

in the presence of a catalyst having a strongly alkaline reaction.

3. The process of preparing β-cyanoalkyl ethers having the general formula $$R_1-O-CH_2-\underset{\underset{R_2}{|}}{CH}-CN$$

in which $R_1$ is the organic radical of an acetylenic monohydric alcohol and $R_2$ is a member of the group consisting of hydrogen and the methyl group which comprises reacting the acetylenic alcohol $R_1OH$ with an unsaturated nitrile $$CH_2=\underset{\underset{R_2}{|}}{C}-CN$$

in the presence of a catalyst having a strongly alkaline reaction.

4. The process of preparing β-methallyloxypropionitrile which comprises reacting methallyl alcohol and acrylonitrile in the presence of a catalyst having a strongly alkaline reaction.

5. The process of preparing β-geranyloxypropionitrile which comprises reacting geraniol and acrylonitrile in the presence of a catalyst having a strongly alkaline reaction.

6. The process of preparing 3-(β-cyanoethoxy)-3-methyl butine-1 which comprises reacting ethinyl dimethyl carbinol with acrylonitrile in the presence of a catalyst having a strongly alkaline reaction.

7. As new compounds, β-cyanoalkyl ethers having the general formula $$R_1-O-CH_2-\underset{\underset{R_2}{|}}{CH}-CN$$

in which $R_1$ is the organic radical of an unsaturated monohydric alcohol and $R_2$ is a member of the group consisting of hydrogen and the methyl group.

8. As new compounds, β-cyanoalkyl ethers having the general formula $$R_1-O-CH_2-\underset{\underset{R_2}{|}}{CH}-CN$$

in which $R_1$ is the organic radical of a diolefinic monohydric alcohol and $R_2$ is a member of the group consisting of hydrogen and the methyl group.

9. As new compounds, β-cyanoalkyl ether having the general formula $$R_1-O-CH_2-\underset{\underset{R_2}{|}}{CH}-CN$$

in which $R_1$ is the organic radical of an acetylenic monohydric alcohol and $R_2$ is a member of the group consisting of hydrogen and the methyl group.

10. β-methallyloxypropionitrile.
11. β-geranyloxypropionitrile.
12. 3-(β-cyanoethoxy)-3-methyl-butine-1.

HERMAN A. BRUSON.